Jan. 22, 1929.
B. G. STERN
1,699,767
COMBINATION FAUCET
Filed May 26, 1927
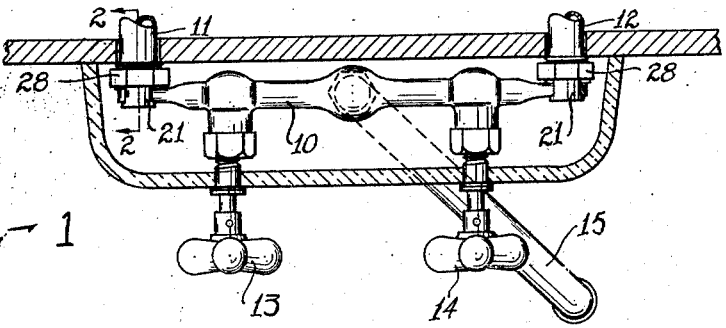
FIG. - 1
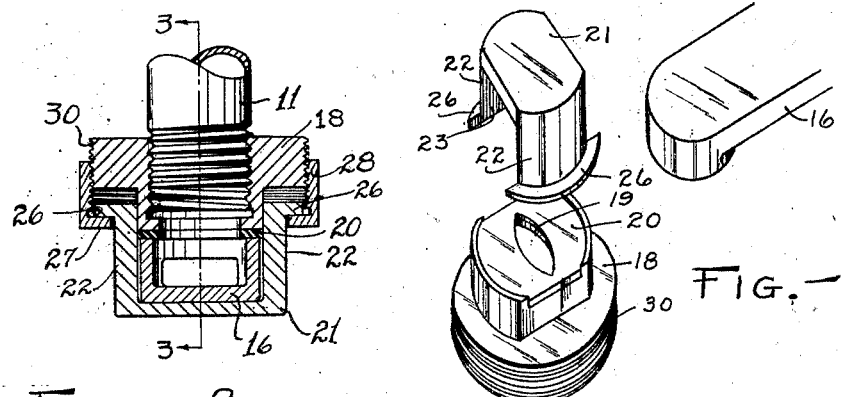
FIG. - 2
FIG. - 5
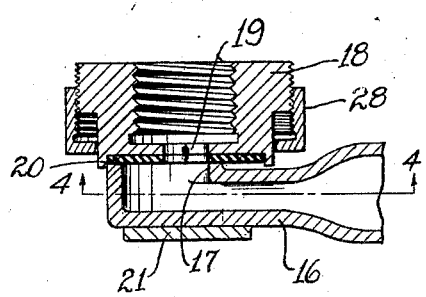
FIG. - 3
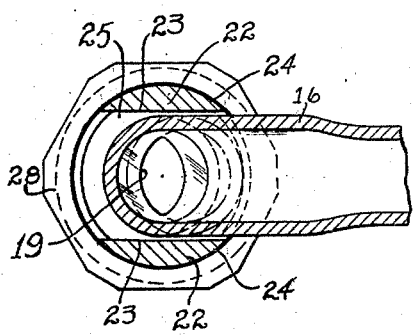
FIG. - 4
Inventor
Bernard G. Stern
By Bates, Macklin, Golrick & Stern
Attorneys Patented Jan. 22, 1929.

1,699,767

UNITED STATES PATENT OFFICE.

BERNARD G. STERN, OF SHAKER HEIGHTS, OHIO.

COMBINATION FAUCET.

Application filed May 26, 1927. Serial No. 194,340.

This invention relates to means for connecting a combination faucet with the hot and cold water supply pipes, and has for one of its objects the provision of means for enabling the one-piece combination faucet body to be readily attached to the pipes, while allowing slight variations in distance between the pipes. In this connection my invention contemplates the provision of a connecting device, which has few operating parts, and which can be cheaply made.

One form of carrying out my invention is illustrated in the drawings, wherein Fig. 1 is a horizontal section thru a sink back, showing a combination faucet having my invention associated therewith; Fig. 2 is a vertical section thru the faucet connection in a plane indicated by the line 2—2 in Fig. 1; Fig. 3 is a section taken thru the faucet and connection on a plane indicated by the line 3—3 in Fig. 2; Fig. 4 is a section taken thru the faucet on a plane indicated by the line 4—4 in Fig. 3; and Fig. 5 is a perspective view showing the relationship of some of the cooperating parts of the faucet.

The faucet illustrated is the combination type having a body 10, which extends between hot and cold water supply pipes 11 and 12 and is provided with shut-off valves 13 and 14 in the usual way. A swinging discharge spout 15 is disposed adjacent the center of the body.

To allow for slight variations of distance between the supply pipes and at the same time to utilize a one-piece body I have shown the body as having a flattened portion 16 at each end thereof, which terminates in an inlet opening 17. Between the inlet opening and the associated pipe there is mounted a sleeve 18 which is threaded onto the pipe and has a central opening 19, which has a substantially elliptical shape as indicated in Fig. 4. A gasket 20 interposed between the sleeve and body has an opening corresponding to that indicated at 19 on the sleeve, and in registration therewith. The sleeve shown is internally threaded to engage the external threads on the supply pipes.

To hold the faucet body in engagement with each sleeve I have illustrated a yoke 21 which extends around the faucet body adjacent each end thereof. The yoke embodies a U-shaped member having arms 22, which preferably have the inner surfaces 23 lying in parallel planes and have arcuate outer surfaces 24. The sleeve has flattened portions 25 against which the inner sides of the arms engage, so as to prevent rotation of the yoke with reference to the sleeve. Each arm moreover has a flange 26 which is adapted to be engaged by an inturned flange 27 on a nut 28. The nut, in turn, is internally threaded and is arranged to engage the exterior threads 30 on the sleeve.

Since the inlet opening in the faucet body is larger in area than that thru the sleeve, it is obvious that a satisfactory connection between the faucet and the pipes may be made, even though there is slight variation in the distance between such pipes. The flattened surface on the sleeve enables one to fasten it onto the pipe in an expeditious manner, while the yoke with the associate nut may readily be slipped over the end of the body and fastened into place on the sleeve.

While I have illustrated and described the combination faucet as having the adjustable mechanism at each end of the body portion I may, if desired, use an ordinary union at one end and use the adjustable feature at the other end. In some places this arrangement will provide sufficient adjusting limits to insure a satisfactory connection with the supply pipes.

An advantage of a combination faucet made in accordance with my invention is the fact that the yoke which embraces the faucet body functions to adjustably clamp it to the relatively stationary sleeve and therefore to the supply pipe and insures a water tight connection between the cooperating parts.

I claim:

1. In combination, a pair of spaced hot and cold water supply pipes, a faucet body extending between the pipes and having an inlet opening adjacent each end thereof, a member threaded onto each pipe and also having external threads, a yoke engaging each end of the body, each member having flattened sides engaged by the associated yoke, and means connecting each yoke to the associated member.

2. In combination, a supply pipe, a faucet body, a sleeve threaded onto to the supply pipe and having flattened portions projecting therefrom on opposite sides of the supply pipe, a yoke embracing the faucet body and having arm portions closely engaging the flattened portions on said sleeve, and a nut in threaded engagement with the sleeve for holding the yoke in clamped position upon the sleeve.

In testimony whereof, I hereunto affix my signature.

BERNARD G. STERN.